United States Patent
Yamamoto et al.

(10) Patent No.: US 8,836,657 B2
(45) Date of Patent: Sep. 16, 2014

(54) POSITIONAL INFORMATION CORRECTION DEVICE, TOUCH SENSOR, POSITIONAL INFORMATION CORRECTION METHOD, AND PROGRAM

(75) Inventors: Kazuyuki Yamamoto, Kanagawa (JP); Takuro Noda, Tokyo (JP); Ikuo Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 13/346,078

(22) Filed: Jan. 9, 2012

(65) Prior Publication Data
US 2012/0182257 A1 Jul. 19, 2012

(30) Foreign Application Priority Data
Jan. 14, 2011 (JP) ................................ P2011-006248

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)
USPC ........... 345/173; 345/174; 345/175; 345/176; 345/177; 345/178; 178/18.02; 178/18.06

(58) Field of Classification Search
USPC ...................... 345/173–178; 178/18.02, 18.06
See application file for complete search history.

(56) References Cited

U.S. PATENT DOCUMENTS

| | | | | |
|---|---|---|---|---|
| 5,442,373 A | * | 8/1995 | Nomura et al. | 345/104 |
| 5,606,346 A | * | 2/1997 | Kai et al. | 345/173 |
| 8,102,376 B2 | * | 1/2012 | Lii et al. | 345/173 |
| 2007/0070049 A1 | * | 3/2007 | Lee et al. | 345/173 |
| 2007/0257890 A1 | * | 11/2007 | Hotelling et al. | 345/173 |
| 2008/0078590 A1 | * | 4/2008 | Sequine | 178/18.06 |
| 2009/0273578 A1 | * | 11/2009 | Kanda et al. | 345/174 |
| 2010/0071459 A1 | * | 3/2010 | Kamm et al. | 73/304 C |
| 2010/0300773 A1 | * | 12/2010 | Cordeiro et al. | 178/18.06 |
| 2011/0061949 A1 | * | 3/2011 | Krah et al. | 178/18.06 |

FOREIGN PATENT DOCUMENTS

JP 2010-39515 2/2010

* cited by examiner

*Primary Examiner* — Jason Olson
*Assistant Examiner* — Linh N Hoffner
(74) *Attorney, Agent, or Firm* — Sherr & Jiang, PLLC

(57) ABSTRACT

A positional information correction device includes a positional information acquisition unit configured to acquire positional information showing a position of an operation body, which is detected by a position detection unit, from a touch sensor that includes a plurality of first electrodes wired along a first direction, a plurality of second electrodes wired along a second direction, and the position detection unit that detects the position of the operation body that approaches the first and second electrodes, based on capacitance on the first and second electrodes, a capacitance value acquisition unit configured to acquire a capacitance value showing a value of the capacitance on the first and second electrodes from the touch sensor, and a positional information correction unit configured to correct the positional information by using a first correction function that includes a first periodic function and a second correction function that includes a second periodic function.

17 Claims, 17 Drawing Sheets

(CAPACITANCE VALUE [a.u.])

| X1 | X2 | X3 | X4 | X5 |
|---|---|---|---|---|
| 0.01 | 0.03 | 0.73 | 0.22 | 0.01 |

| Y1 | Y2 | Y3 | Y4 |
|---|---|---|---|
| 0.01 | 0.02 | 0.60 | 0.37 |

(CALCULATION OF TOUCH POSITION)
X=0.01×1+0.03×2+0.73×3+0.22×4+0.01×5=3.19
Y=0.01×1+0.02×2+0.60×3+0.37×4=3.33

POSITIONAL INFORMATION CORRECTION DEVICE, TOUCH SENSOR, POSITIONAL INFORMATION CORRECTION METHOD, AND PROGRAM

BACKGROUND

The present technology relates to a positional information correction device, a touch sensor, a positional information correction method, and a program.

In recent years, various types of touch sensors have been developed (for example, refer to Japanese Unexamined Patent Application Publication No. 2010-39515), and many types of touch sensors have already been put to practical use. Among these, capacitance type touch sensors have drawn great attention from the perspective of their favorable operability and great durability. When an operation body (for example, a finger) approaches a capacitance type touch sensor, the capacitance type touch sensor detects a position of the operation body by using change of capacitance which occurs between an electrode in the touch sensor and the operation body. Change of capacitance occurring between the electrode and the operation body occurs even when the operation body does not contact with the touch sensor. Accordingly, the touch sensor responses even when the operation body approaches its surface or when the operation body lightly touches its surface. Thanks to such good respondence, a user can obtain superior operability. Further, a capacitance type touch sensor can detect each position of a plurality of operation bodies that approach or contact with its surfaces.

SUMMARY

There is a stream that a capacitance type touch sensor is mounted on various electric apparatus due to its favorable operability and the like. For example, a capacitance type touch sensor is mounted on various portable electronic devices such as a mobile telephone, a portable information terminal, a portable music player, and a portable game machine. Further, a capacitance type touch sensor has been expected to be applied to electronic devices having a relatively large size such as a television receiver, a personal computer, a car navigation system, a digital signage terminal, and an ATM. However, capacitance type touch sensors have some problems that should be overcome. One of the problems is detection accuracy of a touch position.

It is desirable to provide novel and improved positional information correction device, touch sensor, positional information correction method, and program by which an actually-detected touch position can be corrected to be more accurate touch position.

According to an embodiment of the present technology, there is provided a positional information correction device including a positional information acquisition unit configured to acquire positional information showing a position of an operation body, which is detected by a position detection unit, from a touch sensor that includes a plurality of first electrodes wired along a first direction, a plurality of second electrodes wired along a second direction that is approximately orthogonal to the first direction, and the position detection unit that detects the position of the operation body that approaches the first and second electrodes, based on capacitance on the first and second electrodes, a capacitance value acquisition unit configured to acquire a capacitance value showing a value of the capacitance on the first and second electrodes from the touch sensor, and a positional information correction unit configured to correct the positional information that is acquired by the positional information acquisition unit, by using a first correction function that includes a first periodic function having a first amplitude A1 of which a period is a wiring interval of the first electrodes and that corresponds to the capacitance value acquired by the capacitance value acquisition unit and a second correction function that includes a second periodic function having a second amplitude A2 of which a period is a wiring interval of the second electrodes and that corresponds to the capacitance value acquired by the capacitance value acquisition unit.

The first and second amplitudes may increase as the capacitance value decreases.

The first and second amplitudes may have a constant value in a region in which the capacitance value is smaller than a predetermined value, and the first and second amplitudes may increase as the capacitance value decreases in a region in which the capacitance value is larger than the predetermined value.

The first correction function may further include a third periodic function that has a period, which is K times (K is an odd number equal to or larger than 3) as large as the period of the first periodic function, and has a third amplitude A3 corresponding to the capacitance value acquired by the capacitance value acquisition unit. Further, the second correction function may further include a fourth periodic function that has a period, which is K times as large as the period of the second periodic function, and has a fourth amplitude A4 corresponding to the capacitance value acquired by the capacitance value acquisition unit. In this case, a rate of the third amplitude with respect to the first amplitude (A3/A1) and a rate of the fourth amplitude with respect to the second amplitude (A4/A2) increase as the capacitance value decreases.

The positional information correction unit may correct a first coordinate showing a position along the first direction, based on the first correction function, and correct a second coordinate showing a position along the second direction, based on the second correction function, among the positional information acquired by the positional information acquisition unit.

The positional information correction device of the embodiment may further include a speed calculation unit configured to calculate a moving speed of the operation body based on the positional information that is corrected by the positional information correction unit.

The first correction function may further include a third periodic function that has a period, which is twice as large as the period of the first periodic function, and has a third amplitude A3 corresponding to the capacitance value acquired by the capacitance value acquisition unit. Further, the second correction function may further include a fourth periodic function that has a period, which is twice as large as the period of the second periodic function, and has a fourth amplitude A4 corresponding to the capacitance value acquired by the capacitance value acquisition unit. In this case, a rate of the third amplitude with respect to the first amplitude (A3/A1) and a rate of the fourth amplitude with respect to the second amplitude (A4/A2) have an approximately constant value.

The periodic functions included in the first and second correction functions may be sine functions.

The first correction function may be used for correcting an interval of positions, which are detected by the position detection unit when the operation body is moved at a constant speed along the first direction while keeping the capacitance value constant, so as to bring the interval close to constant. Further, the second correction function may be used for correcting an interval of positions, which are detected by the position detection unit when the operation body is moved at a constant speed along the second direction while keeping the capacitance value constant, so as to bring the interval close to constant.

According to another embodiment of the present technology, there is provided a touch sensor including a plurality of first electrodes that are wired along a first direction, a plurality of second electrodes that are wired along a second direction that is approximately orthogonal to the first direction, a capacitance detection unit configured to detect a value of capacitance on the first and second electrodes, a position detection unit configured to detect a position of an operation body that approaches the first and second electrodes, based on the value of capacitance that is detected by the capacitance detection unit, and a position correction unit configured to correct information of the position that is detected by the position detection unit, by using a first correction function that includes a first periodic function of which a period is a wiring interval of the first electrodes and that has a first amplitude corresponding to the value of the capacitance and a second correction function that includes a second periodic function of which a period is a wiring interval of the second electrodes and that has a second amplitude corresponding to the value of the capacitance.

According to still another embodiment of the present technology, there is provided a positional information correction method including acquiring positional information showing a position of an operation body, which is detected by a position detection unit, from a touch sensor that includes a plurality of first electrodes wired along a first direction, a plurality of second electrodes wired along a second direction that is approximately orthogonal to the first direction, and the position detection unit that detects the position of the operation body that approaches the first and second electrodes, based on capacitance on the first and second electrodes, acquiring a capacitance value showing a value of the capacitance on the first and second electrodes from the touch sensor, and correcting the positional information that is acquired in acquiring the positional information, by using a first correction function that includes a first periodic function having a first amplitude A1 of which a period is a wiring interval of the first electrodes and that corresponds to the capacitance value acquired in acquiring the capacitance value and a second correction function that includes a second periodic function having a second amplitude A2 of which a period is a wiring interval of the second electrodes and that corresponds to the capacitance value acquired in acquiring the capacitance value.

According to yet another embodiment of the present technology, there is provided a program that makes a computer realize functions including acquiring positional information showing a position of an operation body, which is detected by a position detection unit, from a touch sensor that includes a plurality of first electrodes wired along a first direction, a plurality of second electrodes wired along a second direction that is approximately orthogonal to the first direction, and the position detection unit that detects the position of the operation body that approaches the first and second electrodes, based on capacitance on the first and second electrodes, acquiring a capacitance value showing a value of the capacitance on the first and second electrodes from the touch sensor, and correcting the positional information that is acquired in acquiring the positional information, by using a first correction function that includes a first periodic function having a first amplitude A1 of which a period is a wiring interval of the first electrodes and that corresponds to the capacitance value acquired in acquiring the capacitance value and a second correction function that includes a second periodic function having a second amplitude A2 of which a period is a wiring interval of the second electrodes and that corresponds to the capacitance value acquired in acquiring the capacitance value.

According to the yet other embodiment, a storage medium in which the above-mentioned program is recorded and which can be read by a computer is provided.

As described above, according to the embodiments of the present technology, a touch position which is actually detected can be corrected to a more accurate touch position.

DETAILED DESCRIPTION OF EMBODIMENTS

Figure 1:
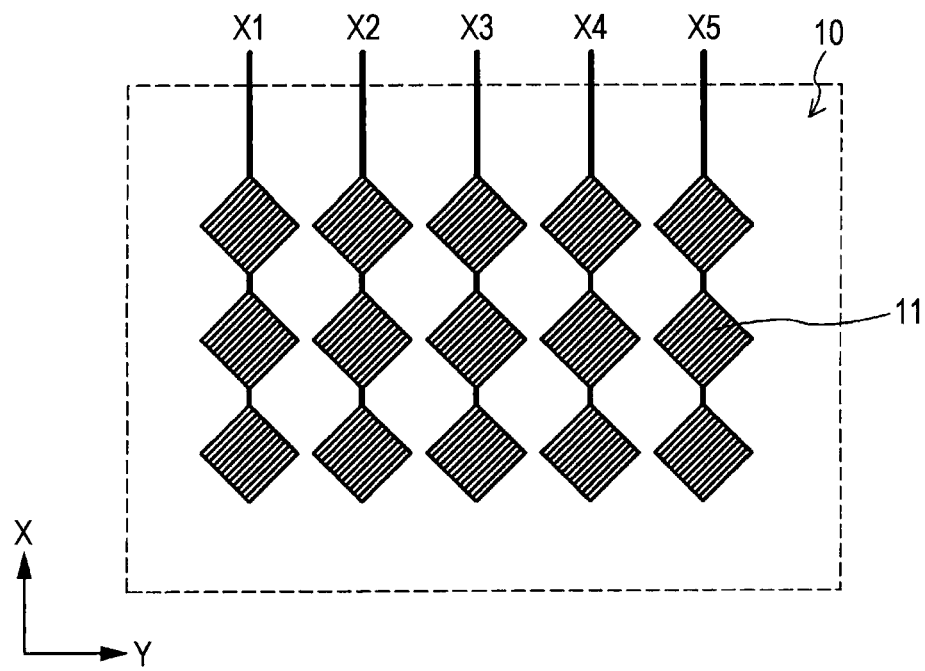
FIG. 1 illustrates the electrode configuration of a capacitance type touch sensor.

Preferred embodiments of the present technology will be described in detail below with reference to the accompanying drawings. Here, in this specification and the drawings, elements having substantively same functional configurations are imparted the same reference character so as to avoid duplicative description.

[Description Flow]

The description flow of the embodiments of the present technology described below is briefly described. The electrode configuration of a capacitance type touch sensor will be first described with reference to FIGS. 1 to 3. A method for detecting a touch position by the capacitance type touch sensor will be next described with reference to FIGS. 4 to 6. Then, a trajectory of a touch position which is actually detected by the capacitance type touch sensor when a drag operation is performed will be described with reference to FIGS. 7 to 9. Further, distribution of capacitance actually detected by the capacitance type touch sensor when a tap operation is performed will be described with reference to FIG. 10.

Subsequently, the functional configuration of a control device 100 constituting the capacitance type touch sensor according to the embodiment of the present technology will be described with reference to FIG. 11. A relationship between magnitude of capacitance which is detected by the capacitance type touch sensor and amplitude of waving appearing on a trajectory of a touch position will be next described with reference to FIG. 12. Then, a property of a correction amount used in a correction method of a touch position according to the embodiment will be described with reference to FIG. 13. Subsequently, an advantageous effect obtained when the correction method of a touch position according to the embodiment is applied will be described with reference to FIGS. 14 and 15.

Another electrode configuration of a capacitance type touch sensor will be next described with reference to FIG. 16. Then, an advantageous effect obtained when the correction method of a touch position according to the embodiment is applied in the capacitance type touch sensor having the other electrode configuration will be described with reference to FIG. 17. Subsequently, a property of a correction amount used in a correction method of a touch position according to the embodiment will be described with reference to FIGS. 18 to 20. Then, the hardware configuration which can realize a function of the control device 100 according to the embodiment or an information processing device on which the capacitance type touch sensor according to the embodiment is mounted will be described with reference to FIG. 21.

Last, a technical idea of the embodiment is summed up and a function effect obtained from the technical idea is briefly described.

(Description Items)

1: Introduction
   1-1: Electrode Configuration of Capacitance Type Touch Sensor
   1-2: Method for Detecting Touch Position by Capacitance Type Touch Sensor
   1-3: About Waving Appearing on Trajectory Detected in Drag Operation
2: Embodiment
   2-1: Functional Configuration of Control Device 100
   2-2: Advantageous Effect Obtained by Correction
3: Modification (Modification of Electrode Configuration)
   3-1: Electrode Configuration of Capacitance Type Touch Sensor
   3-2: Correction Method of Touch Position
   3-3: Advantageous Effect Obtained by Correction
4: Hardware Configuration Example
5: Overview 1: Introduction First, a configuration example of a capacitance type touch sensor and detection accuracy of a touch position which is detected by the capacitance type touch sensor are briefly described.

[1-1: Electrode Configuration of Capacitance Type Touch Sensor]

Figure 2:
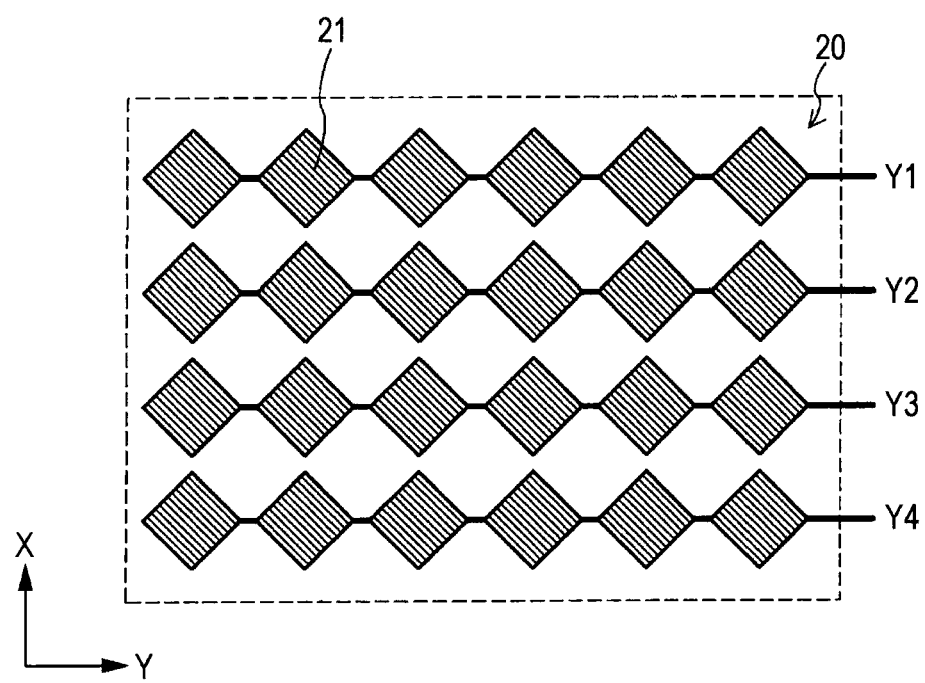
FIG. 2 illustrates the electrode configuration of the capacitance type touch sensor.
Figure 3:
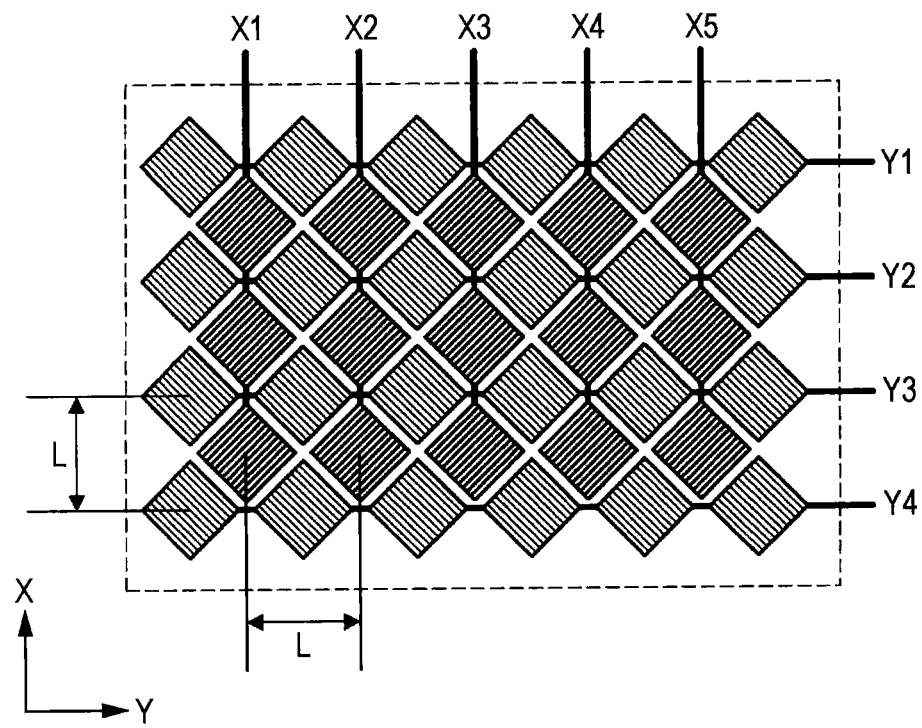
FIG. 3 illustrates the electrode configuration of the capacitance type touch sensor.

The electrode configuration of a capacitance type touch sensor is first described with reference to FIGS. 1 to 3. FIGS. 1 to 3 illustrate the electrode configuration of the capacitance type touch sensor. Here, the electrode configuration of a diamond type is illustrated.

A capacitance type touch sensor includes a plurality of X electrodes 11 (first electrode group 10) which are wired along an X direction as shown in FIG. 1 and a plurality of Y electrodes 21 (second electrode group 20) which are wired along a Y direction as shown in FIG. 2. The first electrode group 10 and the second electrode group 20 are wired such that rectangular parts (referred to below as electrode pads) of the X electrodes 11 and rectangular parts (electrode pads) of the Y electrodes 21 are evenly exposed when they are viewed in a Z direction, as shown in FIG. 3. Here, only several electrodes are shown in the drawings for simplicity, but numerous electrodes are actually provided.

[1-2: Method for Detecting Touch Position by Capacitance Type Touch Sensor]

Figure 4:
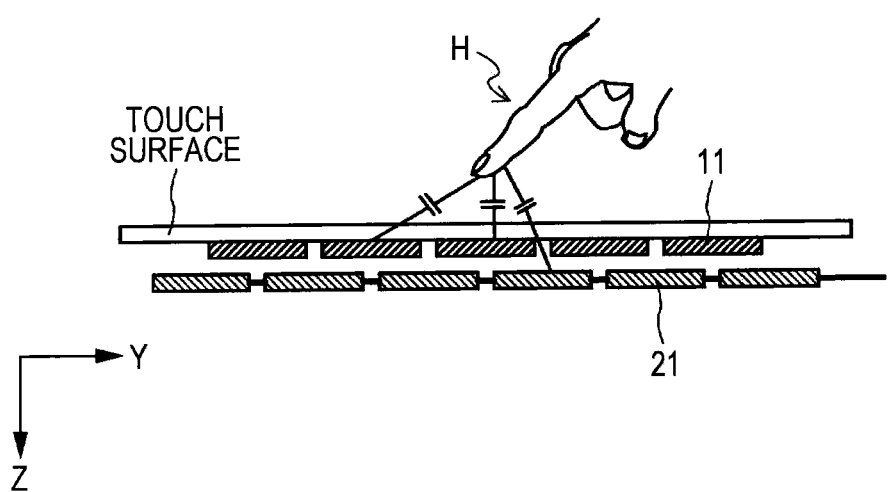
FIG. 4 illustrates a method for detecting a touch position by the capacitance type touch sensor.
Figure 10:
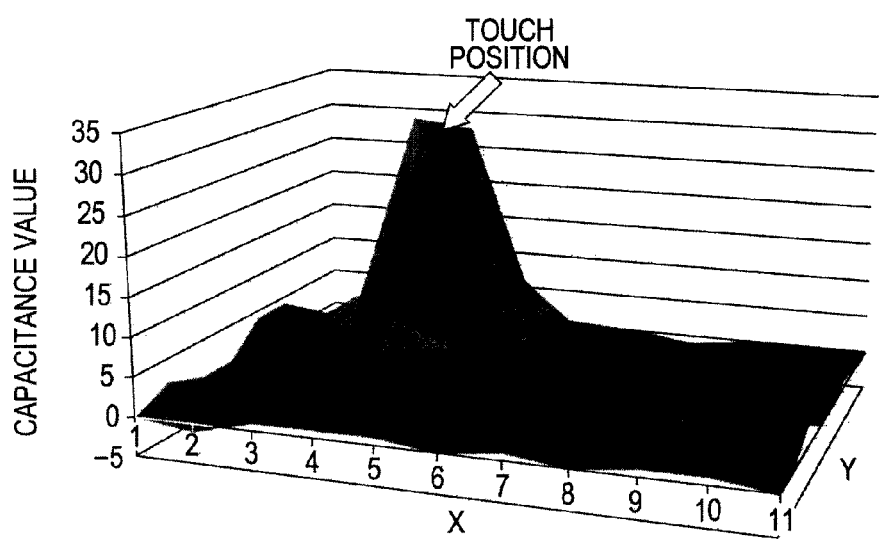
FIG. 10 illustrates distribution of capacitance which is actually detected by the capacitance type touch sensor when a tap operation is performed.

As shown in FIG. 4, when an operation body H (dielectric body) such as a finger approaches the X electrodes 11 (or the Y electrodes 21), electrostatic coupling is generated between the operation body H and the X electrodes 11 (or the Y electrodes 21) and capacitance of the X electrodes 11 (or the Y electrodes 21) increases (for example, refer to FIG. 10). Therefore, approach of the operation body H can be detected by detecting change of capacitance. Further, by monitoring capacitance of each of the X electrodes 11 and each of the Y electrodes 21, a position which the operation body H approaches (referred to below as a touch position) can be detected. Such monitoring of capacitance and detection of a touch position are performed, for example, by the control device 100 which is connected to the first electrode group 10 and the second electrode group 20 as shown in FIG. 5.

Here, the function of the control device 100 may be realized in either of hardware or software. For example, part of the function of the control device 100 may be realized by a control IC of the capacitance type touch sensor based on hardware. Further, part of the function of the control device 100 may be realized by firmware implemented in the control IC of the capacitance type touch sensor. Furthermore, part of the function of the control device 100 may be realized by a device driver used for controlling the capacitance type touch sensor. Furthermore, part of the function of the control device 100 may be realized by middleware or an application which operates on an operating system of an information processing device on which the capacitance type touch sensor is mounted.

Figure 5:
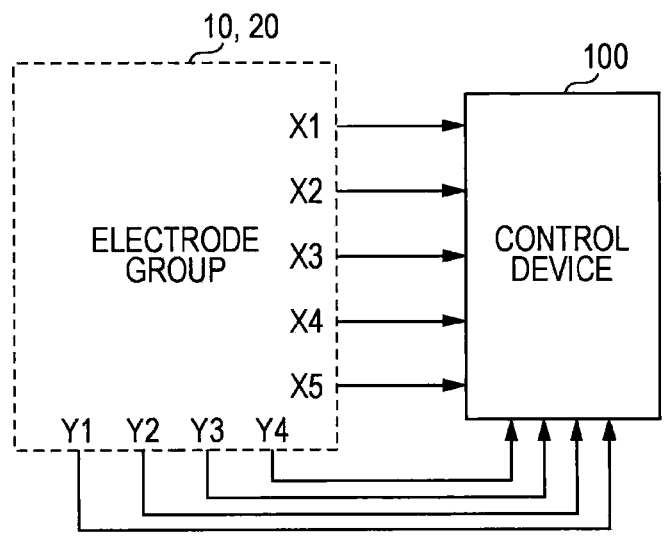
FIG. 5 illustrates the configuration of the capacitance type touch sensor.

As shown in FIG. 5, values of capacitance (referred to below as capacitance values) detected on electrode terminals X1 to X5 of the first electrode group 10 and electrode terminals Y1 to Y4 of the second electrode group 20 are inputted into the control device 100. When a capacitance value of each of the electrodes is inputted, the control device 100 detects a touch position based on the inputted capacitance value of each of the electrodes. The detection method of a touch position is described below.

Figure 6:
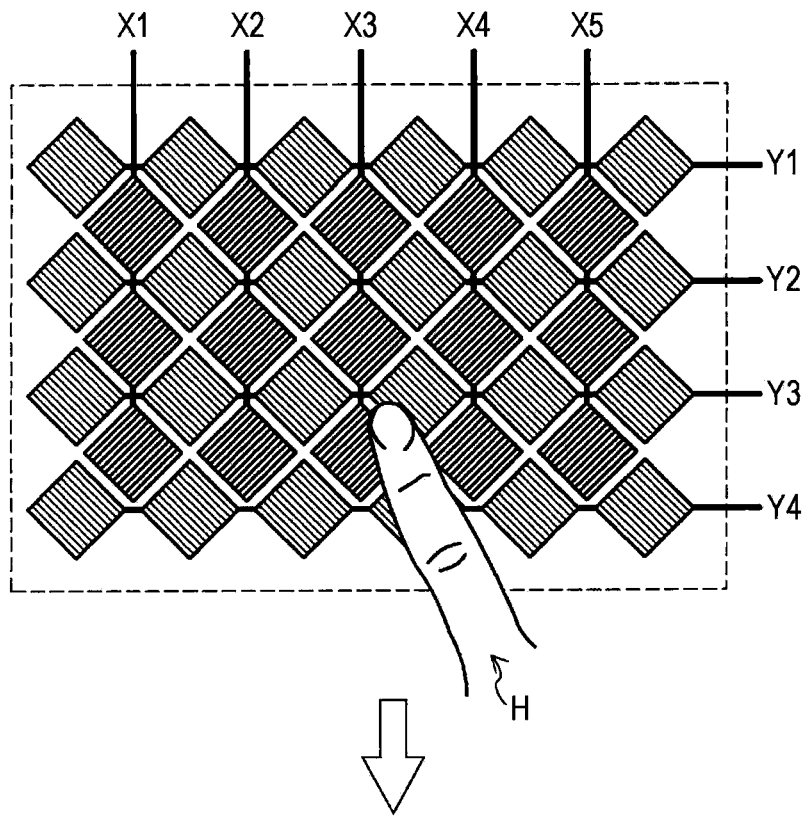
FIG. 6 illustrates the method for detecting a touch position by the capacitance type touch sensor.

As shown in FIG. 6, when the operation body H approaches the X electrodes 11 and the Y electrodes 21, capacitance of the X electrodes 11 and the Y electrodes 21 which are close to the touch position changes. Then, changed capacitance values are detected by the control device 100. For example, as shown in FIG. 6, it is assumed that capacitance values (0.01, 0.03, 0.73, 0.22, and 0.01) are detected from the electrode terminals (X1, X2, X3, X4, and X5). Further, it is assumed that capacitance values (0.01, 0.02, 0.60, and 0.37) are detected from the electrode terminals (Y1, Y2, Y3, and Y4). In this case, the control device 100 detects a touch position by using the detected capacitance values.

Here, capacitance values illustrated here are normalized so that when capacitance values of all of the X electrodes 11 or all of the Y electrodes 21 are added up, the total value becomes 1. Further, X coordinates corresponding to the electrode terminals X1, X2, X3, X4, and X5 are respectively set to 1, 2, 3, 4, and 5. Furthermore, Y coordinates corresponding to the electrode terminals Y1, Y2, Y3, and Y4 are respectively set to 1, 2, 3, and 4. In this case, the X coordinate of the touch position becomes 3.19. The Y coordinate of the touch position becomes 3.33.

Thus, the control device 100 monitors change of capacitance detected on the electrode terminals 1 to X5 of the X electrodes 11 and on the electrode terminals Y1 to Y4 of the Y electrodes 21 and calculates a touch position from the changed capacitance values. Here, a touch position is calculated by using capacitance values detected on all of the electrode terminals X1 to X5 and Y1 to Y4 in the above example. However, a touch position may be calculated by using capacitance values detected on part of the electrode terminals which are positioned around an electrode terminal of which a capacitance value is the largest, for example. In the above example, a touch position may be calculated by using only capacitance values detected on the electrode terminals X2 to X4 and Y2 to Y4.

Hereinbefore, the detection method of a touch position has been described.

[1-3: About Waving Appearing on Trajectory Detected in Drag Operation]

Figure 7:
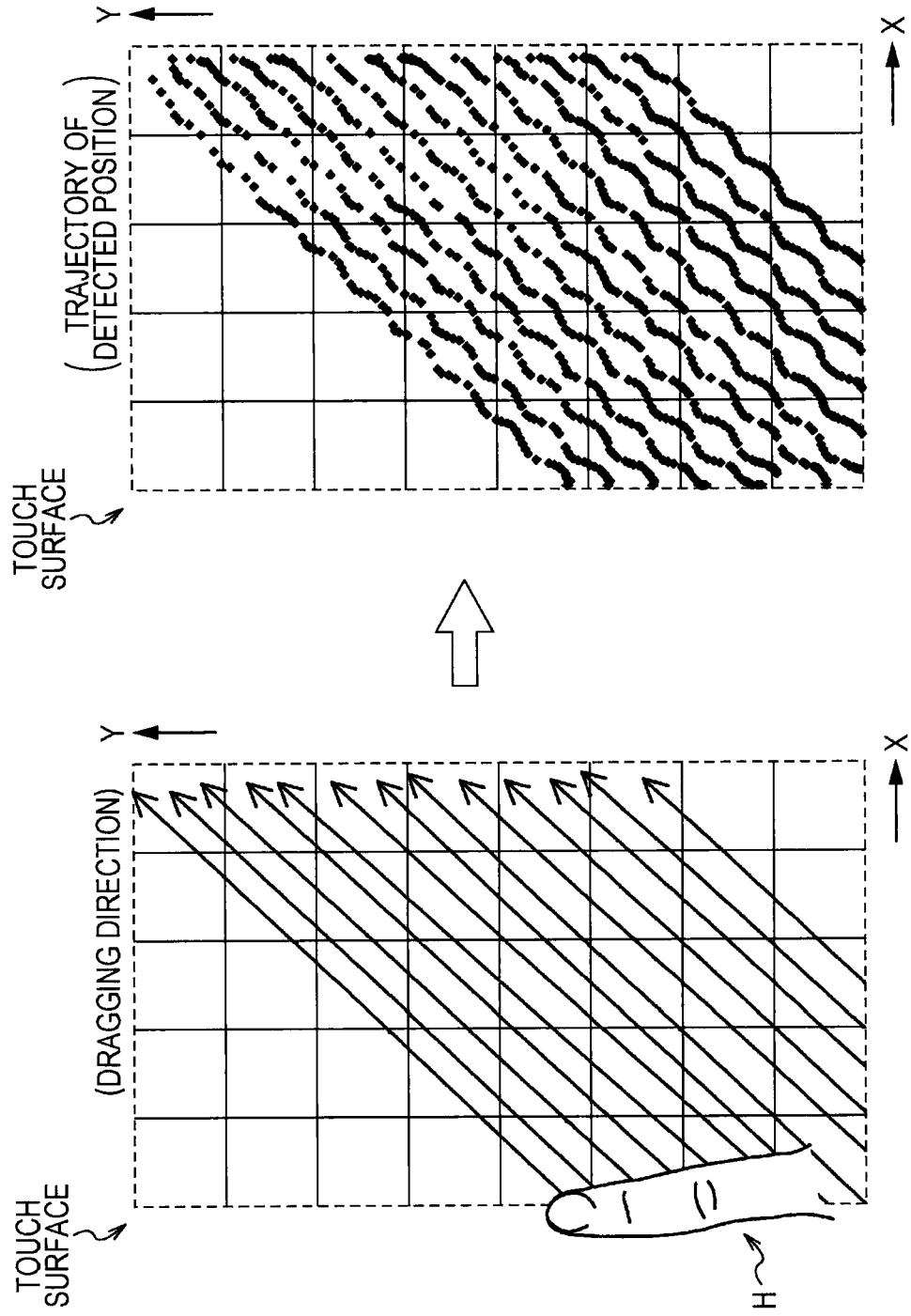
FIG. 7 illustrates a trajectory of a touch position which is actually detected by the capacitance type touch sensor when a drag operation is performed.

Problems of the capacitance type touch sensor will now be described. When the operation body H is slid linearly over a touch surface in an oblique direction as shown in a left drawing of FIG. 7, a trajectory of a touch position shown in a right drawing of FIG. 7 is detected. Apparent from the right drawing of FIG. 7, the trajectory of the touch position has a periodically-waving shape (referred to below as waving). That is, the trajectory drawn by a user with the operation body H and the trajectory which is actually detected by the capacitance type touch sensor do not accord with each other. In other words, there is an error between a coordinate of a position on which the operation body H approaches or contacts with the touch surface and a coordinate of a touch position which is actually detected by the capacitance type touch sensor.

Figure 8:
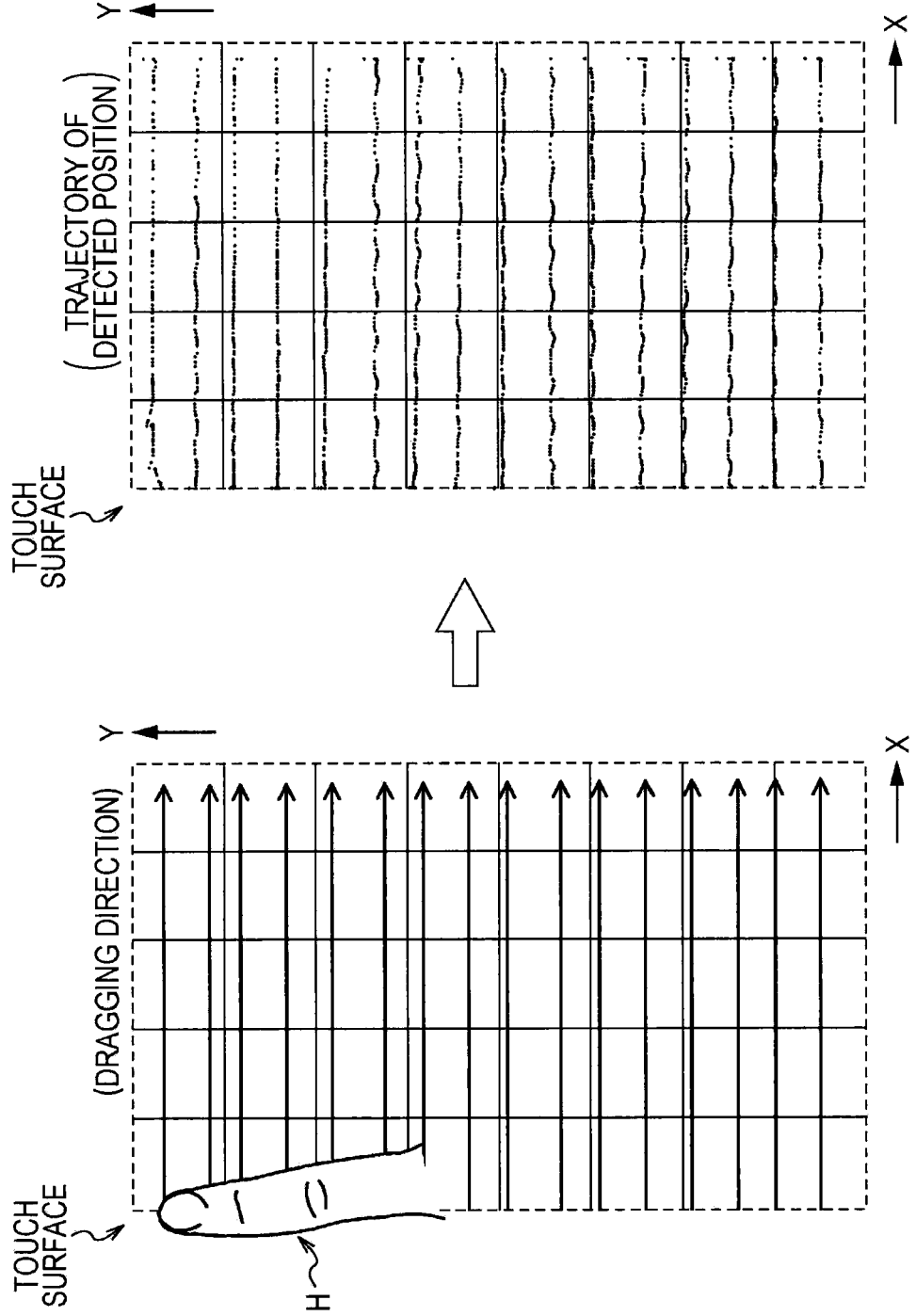
FIG. 8 illustrates a trajectory of a touch position which is actually detected by the capacitance type touch sensor when a drag operation is performed.

When a linear drag operation is performed along the X direction as shown in a left drawing of FIG. 8, a trajectory of a touch position shown in a right drawing of FIG. 8 is detected. As shown in the right drawing of FIG. 8, when the operation body H is moved linearly along the X direction, waving shown in the right drawing of FIG. 7 rarely appears. However, coarseness is confirmed in an alignment of points showing touch positions in the trajectory of the touch position shown in the right drawing of FIG. 8. Since sampling of a touch position is performed at regular time intervals, points showing touch positions with even intervals should be plotted under ordinary circumstances. However, in the right drawing of FIG. 8, coarseness appears on the alignment of points showing touch positions. That is, in this case as well, there is an error between a coordinate of a position on which the operation body H approaches or contacts with the touch surface and a coordinate of a touch position which is actually detected by the capacitance type touch sensor.

Figure 9:
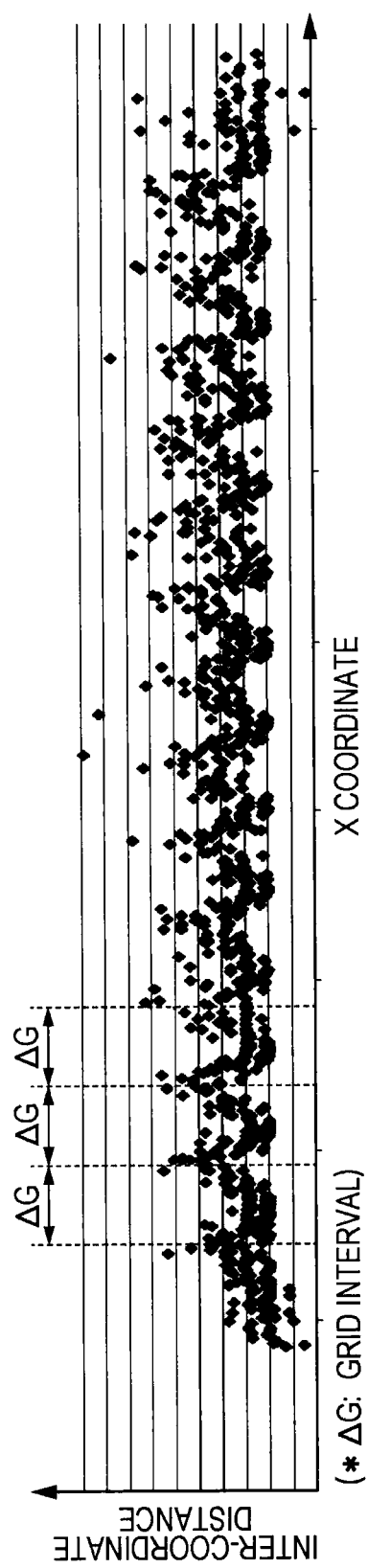
FIG. 9 illustrates a trajectory of a touch position which is actually detected by the capacitance type touch sensor when a drag operation is performed.

As shown in the right drawing of FIG. 7 and the right drawing of FIG. 8, periodic waving or coarseness (both are referred to below as waving) appears on a trajectory of a touch position which is detected by the capacitance type touch sensor in a drag operation. Here, though it is not shown, periodic coarseness is confirmed on an alignment of points showing a touch position in a case where a linear drag operation is performed along the Y direction, as well. Therefore, in order to scrutinize this periodic coarseness, a peak interval of an inter-coordinate distance was measured by plotting a distance between points showing touch positions (distance between points subject to successive sampling; referred to below as inter-coordinate distance) in the example of FIG. 8. As a result, it was found that a peak interval $\Delta G$ exactly accorded with an interval of the X electrodes 11 (grid interval) as shown in FIG. 9. Here, a period of waving observed in a case of a drag operation along the Y direction accords with an interval of the Y electrodes 21 (grid interval).

As described above, an error occurs between a touch position detected by the capacitance type touch sensor and an actual touch position, depending on a position which is touched. Therefore, a different coordinate is detected when a tap operation is performed, and a command which a user does not intend may be executed disadvantageously. Further, waving appears on a trajectory of a touch position which is detected when a drag operation is performed, so that an object which moves while following the drag operation moves in unusual ways or gesture is not correctly recognized. Furthermore, a inter-coordinate distance changes even when a drag operation is performed at a constant speed, so that a moving speed fluctuates even in an operation, of which a moving direction is fixed, such as screen scrolling, imparting a feeling of strangeness to a user.

In view of such problems, the present inventors have devised a system by which a touch position can be more correctly detected by the capacitance type touch sensor. A period of waving depends on an interval of the X electrodes 11 and an interval of the Y electrodes 21. Therefore, waving can be suppressed to some extent by narrowing an interval of the X electrodes 11 and the Y electrodes 21 (by increasing grid density). However, if the number of electrodes is increased, time for scanning a touch position is prolonged, causing response degradation. Further, manufacturing cost is increased due to increase of the number of terminals. Therefore, it is favorable to maintain the grid interval approximately 5 to 7 mm, for example.

2: Embodiment

An embodiment of the present technology will now be described. The present embodiment relates to a system by which a touch position is more accurately detected by the capacitance type touch sensor. Here, this system is realized by the function of the control device 100.

[2-1: Functional Configuration of Control Device 100]

The functional configuration of the control device 100 according to the embodiment is first described with reference to FIG. 11. FIG. 11 illustrates the functional configuration of the control device 100 according to the embodiment.

Figure 11:
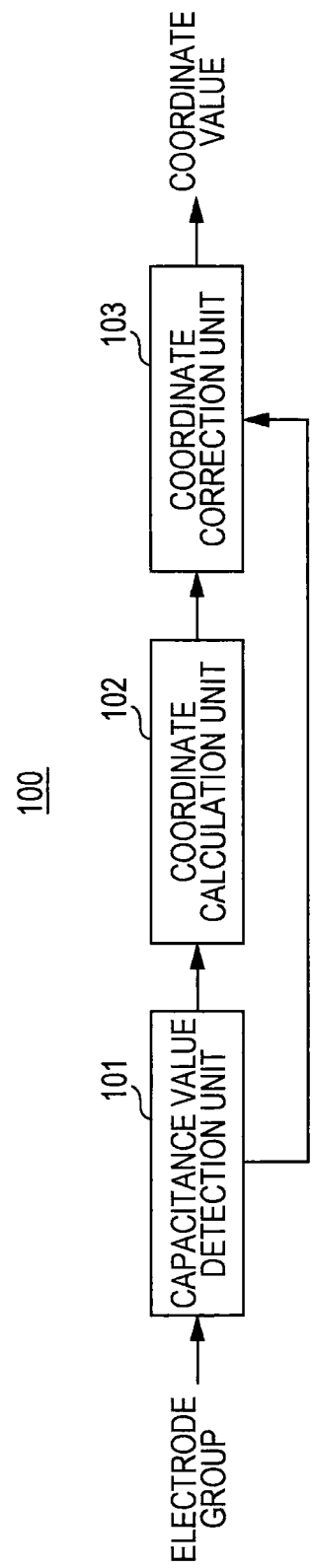
FIG. 11 illustrates the functional configuration of a control device constituting a capacitance type touch sensor according to an embodiment of the present technology.

As shown in FIG. 11, the control device 100 is composed of a capacitance value detection unit 101, a coordinate calculation unit 102, and a coordinate correction unit 103.

First, the capacitance value detection unit 101 detects a capacitance value of each of the X electrodes 11 and each of the Y electrodes 21. When the capacitance value detection unit 101 detects a capacitance value, the capacitance value detection unit 101 inputs the detected capacitance value into the coordinate calculation unit 102 and the coordinate correction unit 103. When the capacitance value of each of the X electrodes 11 and each of the Y electrodes 21 is inputted, the coordinate calculation unit 102 calculates a coordinate of a touch position by the method shown in FIG. 6, for example. When the coordinate calculation unit 102 calculates the coordinate of the touch position, the coordinate calculation unit 102 inputs the calculated coordinate of the touch position into the coordinate correction unit 103. When the capacitance value of each of the X electrodes 11 and each of the Y electrodes 21 and the coordinate of the touch position are inputted, the coordinate correction unit 103 corrects the inputted coordinate of the touch position by using the inputted capacitance value.

At this time, the coordinate correction unit 103 corrects the coordinate of the touch position by using a correction function including a periodic function of which a period is an interval of the X electrodes 11 and an interval of the Y electrodes 21, so as to cancel waving. For example, the coordinate correction unit 103 corrects the coordinate of the touch position as the following formulas (3) and (4) by using correction functions fx and fy shown as the following formulas (1) and (2). Here, a coordinate before correction is set to (X, Y), a coordinate after the correction is set to (X', Y'), an interval of the X electrodes 11 is set to L, and an interval of the Y electrodes 21 is set to L.

$$fx = a\sin\left(\frac{2\pi X}{L}\right) + b\sin\left(\frac{2\pi \cdot 3X}{L}\right) \quad (1)$$

$$fy = c\sin\left(\frac{2\pi Y}{L}\right) + d\sin\left(\frac{2\pi \cdot 3Y}{L}\right) \quad (2)$$

$$X' = X + fx \quad (3)$$

$$Y' = Y + fy \quad (4)$$

Figure 12:
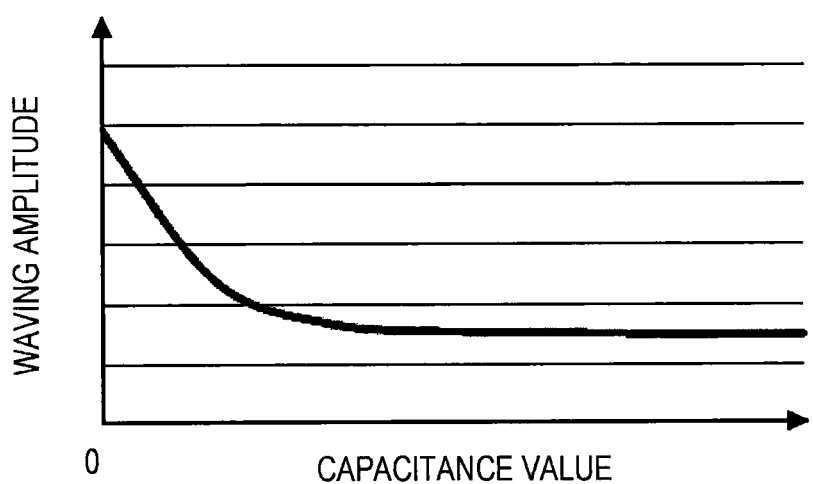
FIG. 12 illustrates a relationship between a magnitude of capacitance which is detected by the capacitance type touch sensor and amplitude of waving appearing on a trajectory of a touch position.

The correction functions fx and fy defined by taking into consideration of a third-order component are introduced in addition to a sine function of the period L in view of a triangle waveform of the waving (refer to the right drawing of FIG. 7, for example). Of course, a high-order component of odd-order such as a fifth-order component may be further taken into consideration. Further, coefficients a, b, c, and d included in the above-mentioned correction functions fx and fy are determined in accordance with magnitude of a capacitance value which is detected by the capacitance value detection unit 101. As shown in FIG. 12, amplitude of waving depends on the magnitude of a capacitance value. In particular, there is such tendency that as the capacitance value decreases, the amplitude of waving increases. Therefore, in order to perform correcting to favorably cancel waving, it is favorable to change the coefficients a, b, c, and d indicating amplitudes of the correction functions fx and fy in accordance with the capacitance value.

Figure 13:
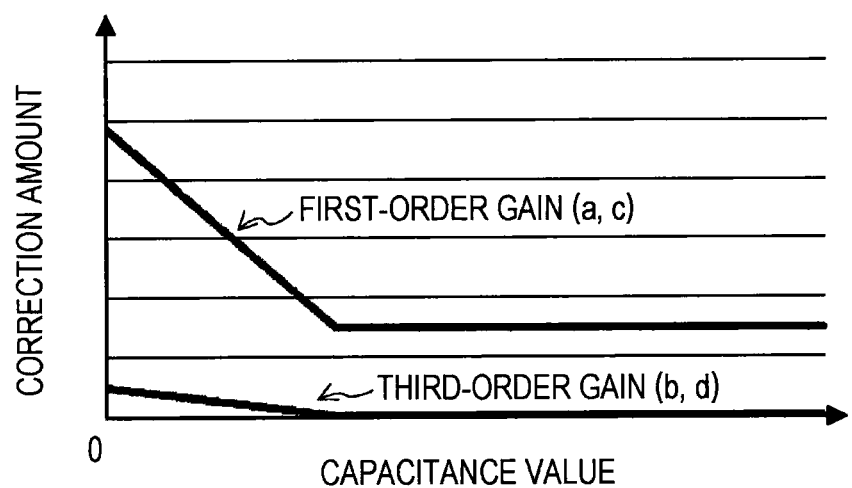
FIG. 13 illustrates a property of a correction amount which is used in a correction method of a touch position according to the embodiment.

For example, the coordinate correction unit 103 determines coefficients a and c (first-order gain) corresponding to a first-order component of the correction functions fx and fy and coefficients b and d (third-order gain) corresponding to a third-order component, depending on a capacitance value, as shown in FIG. 13. The sizes of coefficients a, b, c, and d are referred to as correction amounts. The correction amount is set so that the correction amount has a large value as the capacitance value decreases, as is the case with the property of waving shown in FIG. 12. Further, the form of waving becomes close to a triangle wave as the capacitance value decreases, so that a third-order gain is set large in a region in which the capacitance value is small. For example, the coefficients a, b, c, and d are expressed by a predetermined function depending on a capacitance value or expressed by using a data table or the like which is obtained by mapping actually-measured values of the waving.

Thus, the coordinate correction unit 103 corrects a coordinate by the correction functions fx and fy including periodic functions of which periods are the interval of the X electrodes 11 and the interval of the Y electrodes 21, so as to cancel waving appearing on the trajectory of a touch position. The following advantageous effect can be obtained due to this correction.

[2-2: Advantageous Effect Obtained by Correction]

Figure 14:
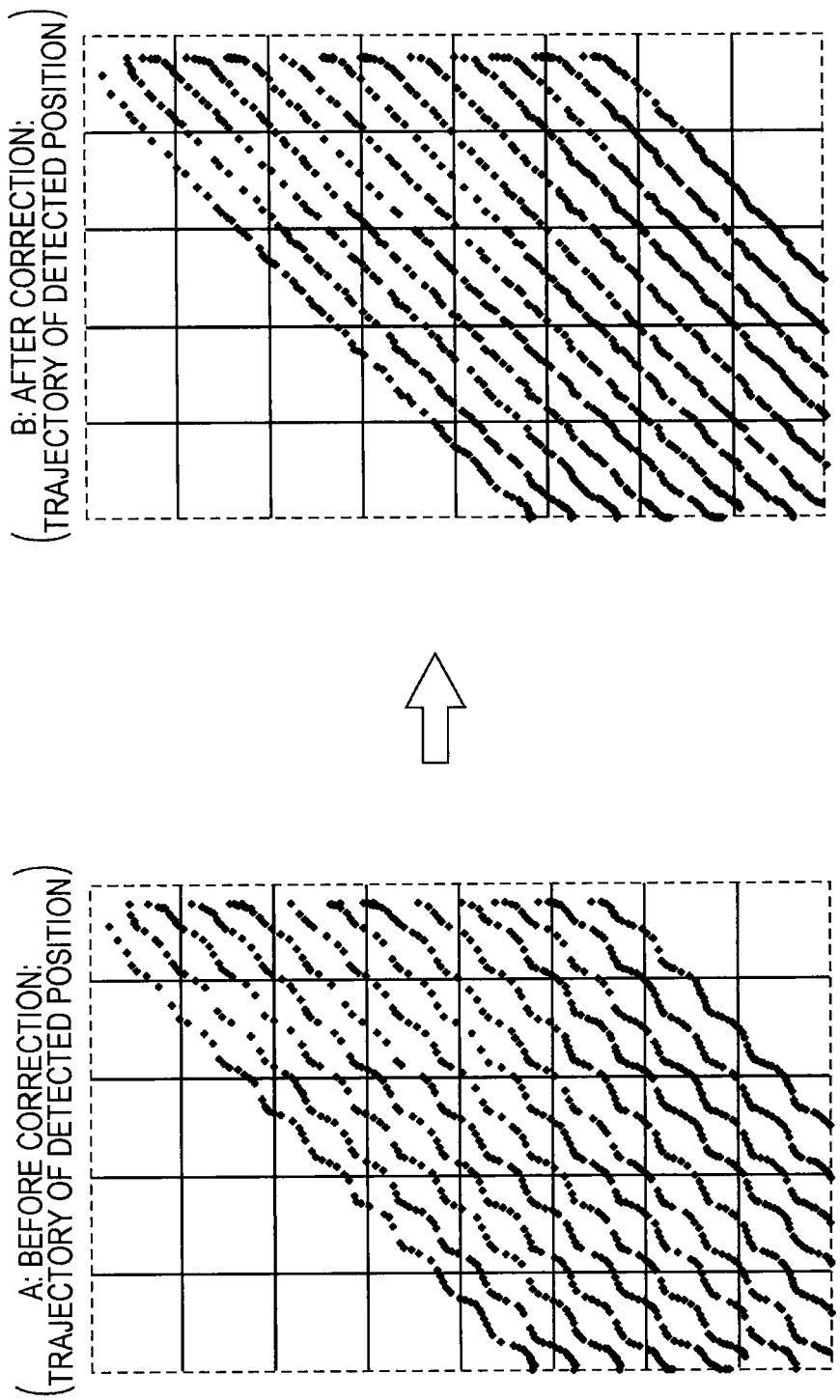
FIG. 14 illustrates an advantageous effect which is obtained when the correction method of a touch position according to the embodiment is applied.
Figure 15:
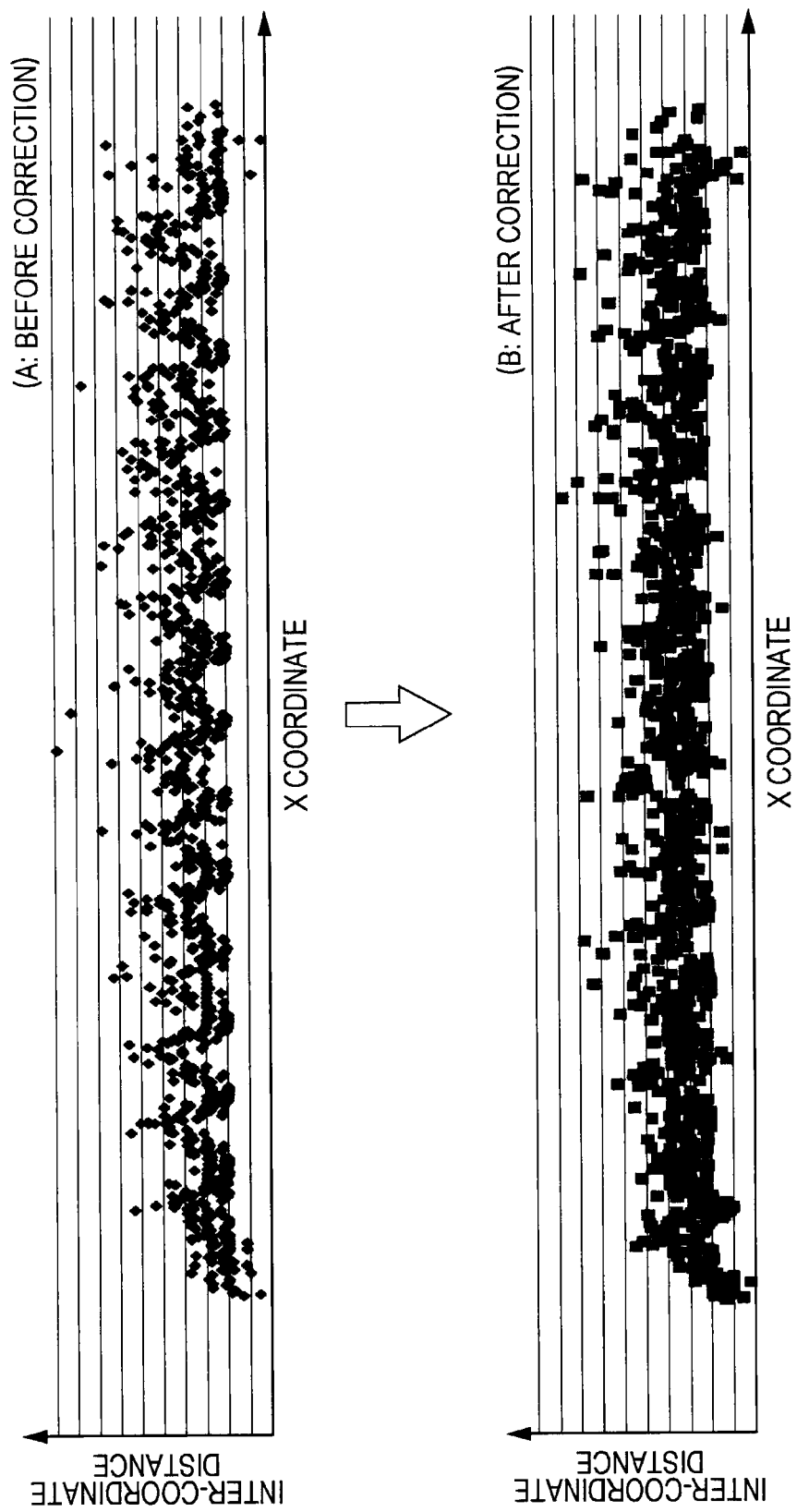
FIG. 15 illustrates an advantageous effect which is obtained when the correction method of a touch position according to the embodiment is applied.

First, FIG. 14 is referred. FIG. 14 illustrates a result of applying the correction functions fx and fy shown as the above-mentioned formulas (3) and (4) to a trajectory of a touch position which is detected in a case of performing a drag operation in an oblique direction. Referring to FIG. 14, it is understood that amplitude of waving is sufficiently suppressed by applying the correction functions fx and fy shown as the above-mentioned formulas (3) and (4) to the trajectory. FIG. 15 is next referred. FIG. 15 illustrates a result of applying the correction functions fx and fy shown as the above-mentioned formulas (3) and (4) to a trajectory of a touch position which is detected in a case of performing a drag operation in the X direction. Referring to FIG. 15, it is understood that waving of an inter-coordinate distance (corresponding to speed) is suppressed by applying the correction functions fx and fy shown as the above-mentioned formulas (3) and (4) to the trajectory. Thus, waving appearing in a detecting result of a touch position obtained by the capacitance type touch sensor can be suppressed by applying the coordinate correction according to the embodiment.

The embodiment has been described hereinbefore. By correctly correcting a coordinate of a touch position as described above, an erratic determination occurring in a tap operation, fluctuation of speed and a trajectory occurring in a drag operation, a false recognition of a gesture operation, and the like can be suppressed.

3: Modification

Modification of Electrode Configuration

A modification of the embodiment will now be described. This modification relates to a method for applying the technique according to the embodiment to a capacitance type touch sensor having the line type electrode configuration.

[3-1: Electrode Configuration of Capacitance Type Touch Sensor]

Figure 16:
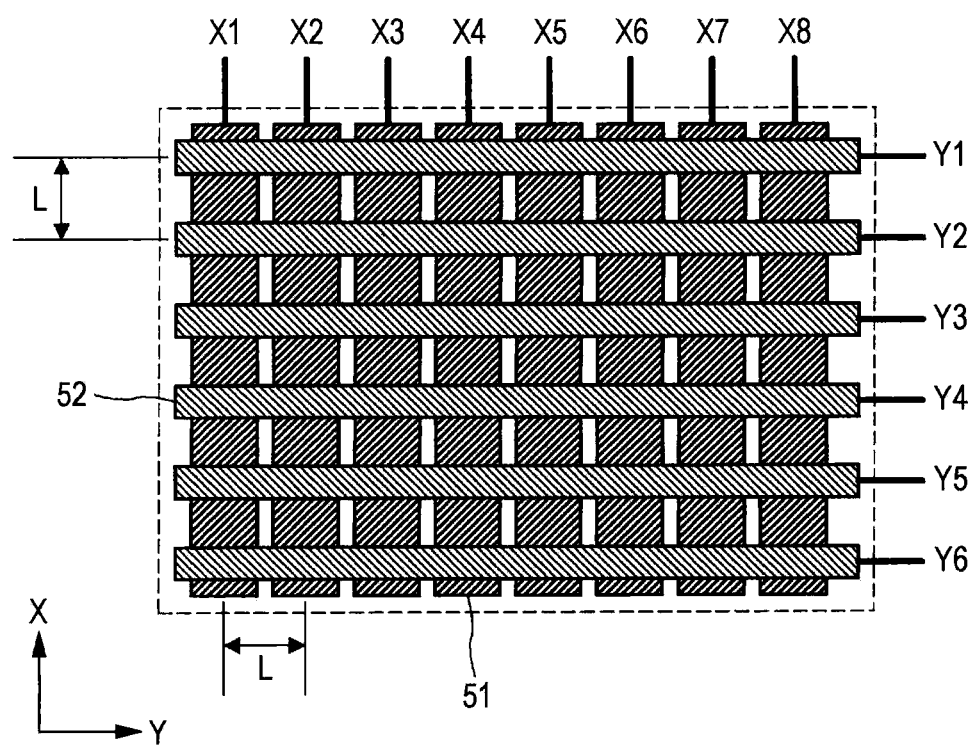
FIG. 16 illustrates another electrode configuration of a capacitance type touch sensor.

As shown in FIG. 16, a capacitance type touch sensor having the line type electrode configuration is partitioned by thin slits and includes a plurality of X electrodes 51 which are arranged to cover the approximately whole surface and serve as GND and a plurality of Y electrodes 52 which have a linear shape. As is the case with the capacitance type touch sensor described above, capacitance of the X electrodes 51 and the Y electrodes 52 is monitored by the control device 100. The control device 100 detects a coordinate of a touch position from change of the capacitance. The functional configuration of the control device 100 is same as that shown in FIG. 11. However, in this case, the configuration of a correction function used for correction of a coordinate performed by the coordinate correction unit 103 is modified as the following.

[3-2: Correction Method of Touch Position]

The coordinate correction unit 103 corrects a coordinate of a touch position by using correction functions including periodic functions of which periods are an interval of the X electrodes 51 and an interval of the Y electrodes 52, so as to cancel waving. For example, the coordinate correction unit 103 corrects a coordinate of a touch position as the following formulas (7) and (8) by using correction functions fx' and fy' shown as the following formulas (5) and (6). Here, a coordinate before correction is set to (X, Y), a coordinate after the correction is set to (X', Y'), an interval of the X electrodes 51 is set to L, and an interval of the Y electrodes 52 is set to L.

$$fx' = a\sin\left(\frac{2\pi X}{L}\right) + b\sin\left(\frac{2\pi \cdot 2X}{L}\right) \quad (5)$$

$$fy' = c\sin\left(\frac{2\pi Y}{L}\right) + d\sin\left(\frac{2\pi \cdot 2Y}{L}\right) \quad (6)$$

$$X' = X + fx' \quad (7)$$

$$Y' = Y + fy' \quad (8)$$

[3-3: Advantageous Effect Obtained by Correction]

Figure 17:
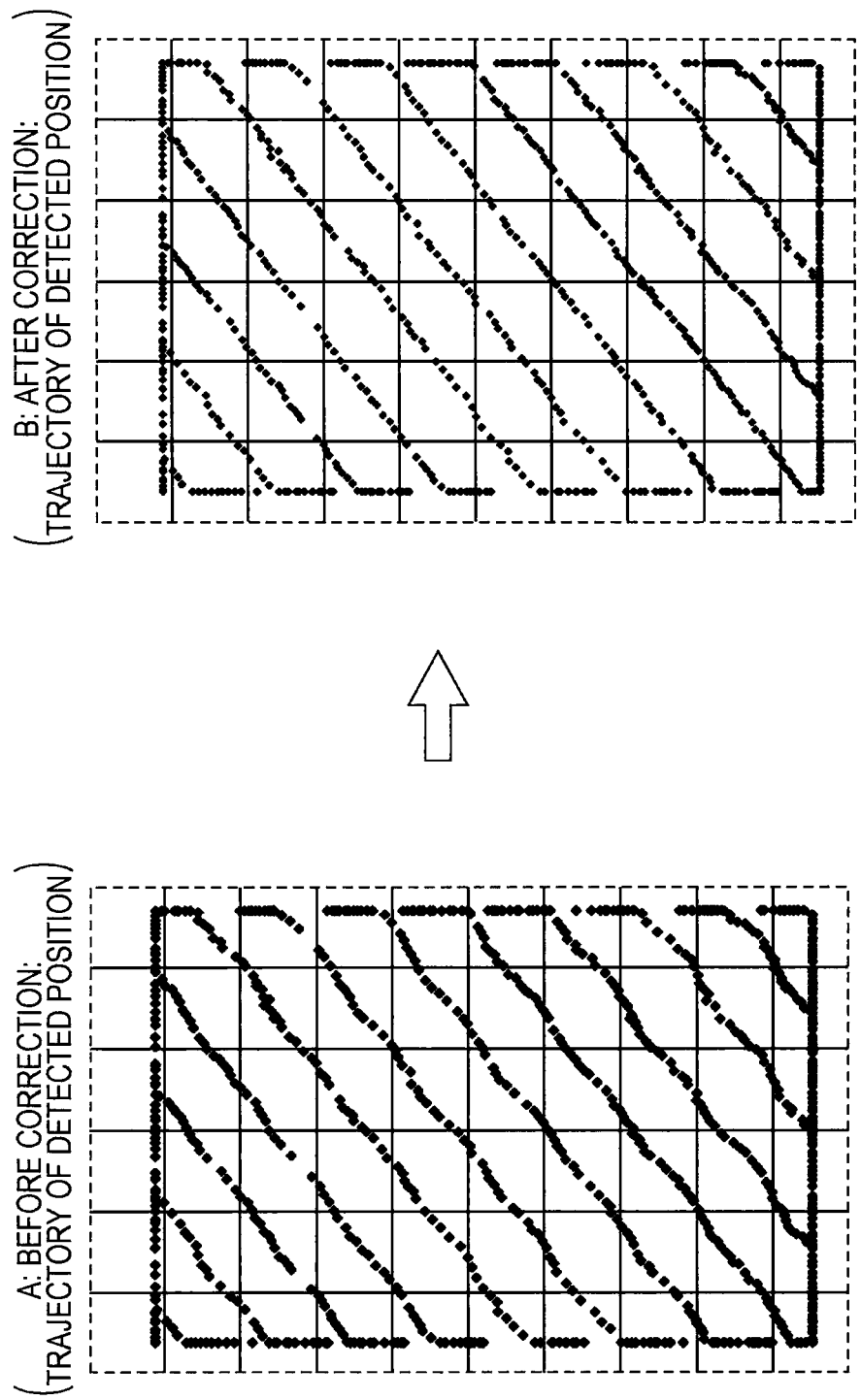
FIG. 17 illustrates an advantageous effect which is obtained when a correction method of a touch position according to the embodiment is applied in a capacitance type touch sensor having the other electrode configuration.

In the case of the electrode configuration according to this modification, a trajectory of a touch position detected by the capacitance type touch sensor when a drag operation is performed in an oblique direction becomes as the one shown in a left drawing of FIG. 17. A trajectory after corrected by the correction functions fx' and fy' shown as the above-mentioned formulas (7) and (8) becomes as the one shown in a right drawing of FIG. 17. Apparent from the comparison of the left drawing and the right drawing of FIG. 17, waving appearing on the trajectory of a touch position is suppressed by the above-mentioned correction.

(Supplemental Explanation)

Figure 18:
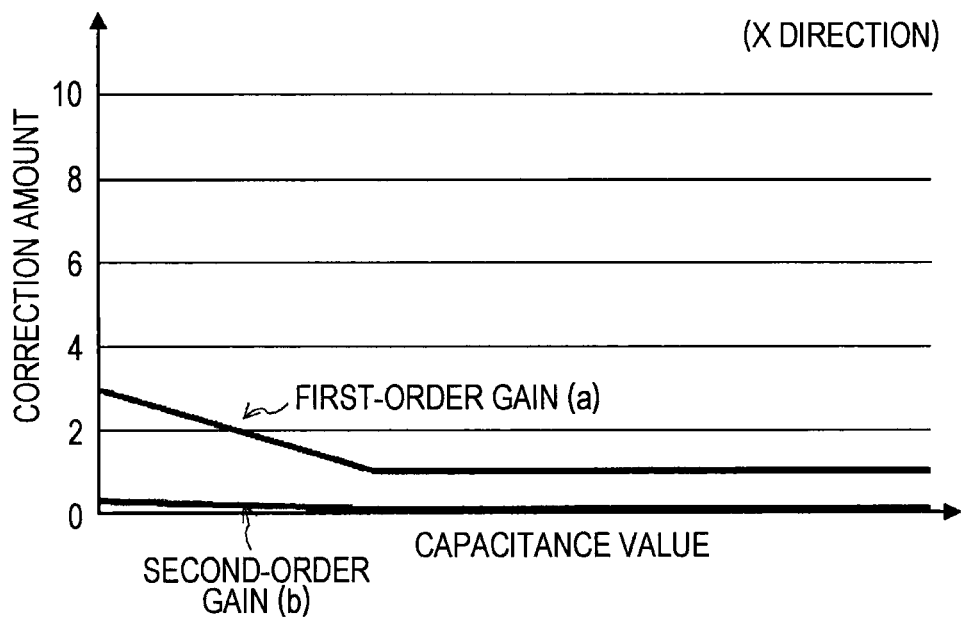
FIG. 18 illustrates a property of a correction amount which is used in the correction method of a touch position according to the embodiment.
Figure 19:
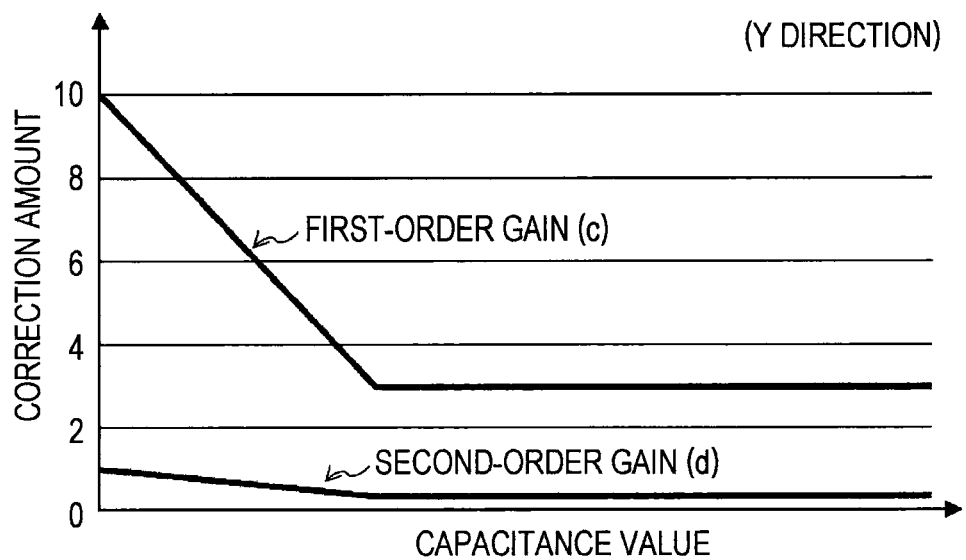
FIG. 19 illustrates a property of a correction amount which is used in the correction method of a touch position according to the embodiment.

Coefficients a, b, c, and d representing amplifications of the correction functions fx' and fy' have a dependence relationship with respect to a capacitance value (refer to FIGS. 18 and 19). In the case of this modification, the width of the X electrodes 51 is large and the width of the Y electrodes 52 is small. Therefore, change of capacitance with respect to slight positional change of the operation body H easily occurs on the Y electrodes 52 having the smaller width than the X electrodes 51. Accordingly, correction amount with respect to the Y direction (FIG. 19) is several times as large (three times in this example) as a correction amount with respect to the X direction (FIG. 18). Here, a ratio a/b and a ratio c/d are set constant in this example.

Figure 20:
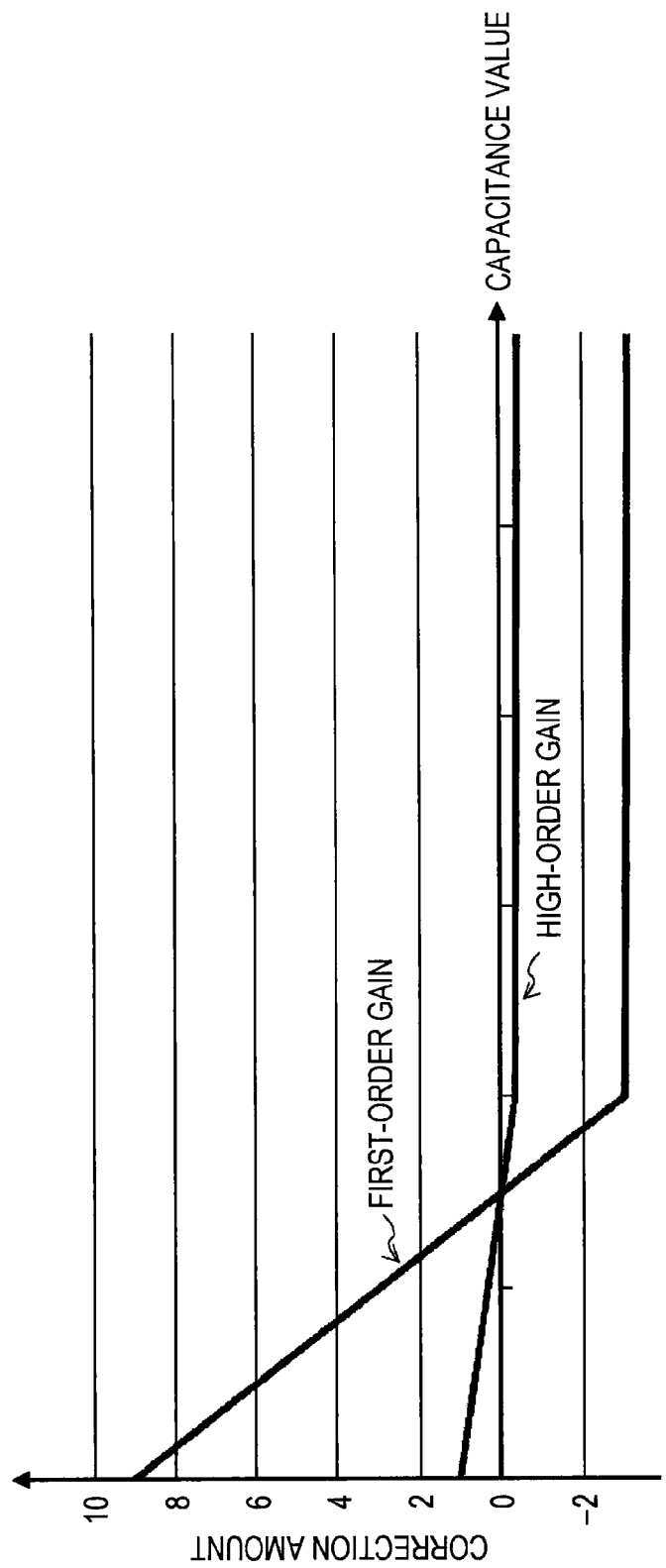
FIG. 20 illustrates a property of a correction amount which is used in the correction method of a touch position according to the embodiment.

Thus, coefficients a, b, c, and d representing amplifications of the correction functions fx' and fy' should be arbitrarily adjusted depending on the electrode configuration. For example, there is a case where a property shown in FIG. 20 is obtained as a result of adjusting a correction amount so as to cancel waving appearing in a certain capacitance type touch sensor. In the example of FIG. 20, a correction amount has a negative value in a region in which a capacitance value is large. However, in this case, adjustment of the correction amount should be performed from an actually-measured value and the like.

One modification example according to the embodiment has been described hereinbefore. By correctly correcting a coordinate of a touch position as above, an erratic determination occurring in a tap operation, fluctuation of speed and a trajectory occurring in a drag operation, a false recognition of a gesture operation, and the like can be suppressed.

4: Hardware Configuration Example

Figure 21:
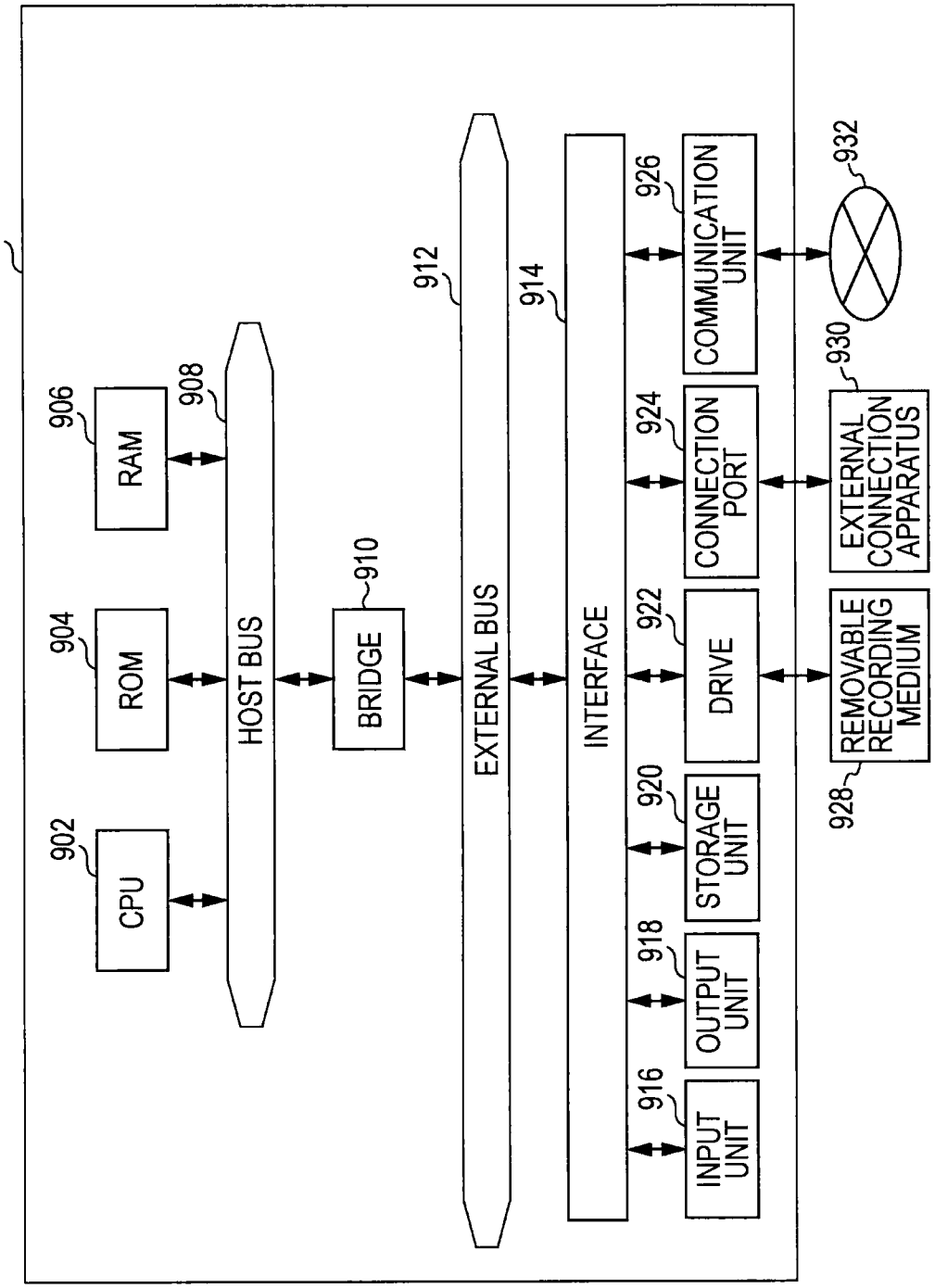
FIG. 21 illustrates the hardware configuration which can realize a function of a control device according to the embodiment or an information processing device on which the capacitance type touch sensor according to the embodiment is mounted.

Functions of the control device 100 described above or respective elements included in an information processing device on which the above-described capacitance type touch sensor is mounted can be realized by using the hardware configuration shown in FIG. 21, for example. That is, functions of the respective elements are realized by controlling hardware shown in FIG. 21 by using a computer program. The configuration of this hardware is arbitrary and hardware may be a personal computer, a portable information terminal such as a mobile telephone, a PHS, and a PDA, a game machine, and various information home electrical appliances. Here, the above-mentioned PHS is an abbreviation of a personal handy-phone system. Further, the above-mentioned PDA is an abbreviation of a personal digital assistant.

As shown in FIG. 21, this hardware mainly includes a CPU 902, a ROM 904, a RAM 906, a host bus 908, and a bridge 910. This hardware further includes an external bus 912, an interface 914, an input unit 916, an output unit 918, a storage unit 920, a drive 922, a connection port 924, and a communication unit 926. Here, the above-mentioned CPU is an abbreviation of a central processing unit. Further, the above-mentioned ROM is an abbreviation of a read only memory. Furthermore, the above-mentioned RAM is an abbreviation of a random access memory.

The CPU 902 functions as an arithmetic processing device or a control device, for example, and controls the whole or part of operations of respective elements based on various types of programs stored in the ROM 904, the RAM 906, the storage unit 920, or a removable recording medium 928. The ROM 904 is a unit for storing a program read by the CPU 902, data used for calculation, and the like. In the RAM 906, a program read by the CPU 902 and various parameters which arbitrarily change when the program is executed, for example, are stored temporarily or permanently.

These elements are mutually connected via the host bus 908 which can perform high-speed data transmission, for example. On the other hand, the host bus 908 is connected with the external bus 912 of which a data transmission speed is relatively low, via the bridge 910, for example. As the input unit 916, a mouse, a keyboard, a touch panel, a button, a switch, a lever, or the like, for example, is used. Further, a remote controller which can transmit a control signal by using infrared rays or other electric waves may be used as the input unit 916.

The output unit 918 is a device which can inform acquired information visually or aurally with respect to a user and examples of the output unit 918 include a display device such as a CRT, an LCD, a PDP, and an ELD, an audio output device such as a speaker and a headphone, a printer, a mobile telephone, a fax machine, and the like. Here, the above-mentioned CRT is an abbreviation of a cathode ray tube. The above-mentioned LCD is an abbreviation of a liquid crystal display. The above-mentioned PDP is an abbreviation of a plasma display panel. The above-mentioned ELD is an abbreviation of an electro-luminescence display.

The storage unit 920 is a device for storing various types of data. As the storage unit 920, a magnetic storage device such as a hard disk drive (HDD), a semiconductor storage device, an optical storage device, a magnetic optical storage device, or the like, for example, can be used. Here, the above-mentioned HDD is an abbreviation of a hard disk drive.

The drive 922 is a device which reads out information stored in the removable recording medium 928 which is a magnetic disk, an optical disk, a magnet-optical disk, a semiconductor memory, or the like, for example, or writes information in the removable recording medium 928. The removable recording medium 928 is a DVD medium, a Blu-ray medium, an HD DVD medium, various semiconductor storage media, or the like, for example. Of course, the removable recording medium 928 may be an IC card on which a non-contact type IC chip is mounted, an electronic device, or the like, for example. Here, the above-mentioned IC is an abbreviation of an integrated circuit.

The connection port 924 is a port to which an external connection apparatus 930 is connected and examples of the connection port 924 include a USB port, an IEEE1394 port, a SCSI, an RS-232C port, an optical audio terminal, and the like. The external connection apparatus 930 is a printer, a portable music player, a digital camera, a digital video camera, an IC recorder, or the like, for example. Here, the above-mentioned USB is an abbreviation of a universal serial bus. Further, the above-mentioned SCSI is an abbreviation of a small computer system interface.

The communication unit 926 is a communication device connected to a network 932, and examples of the communication unit 926 include a wired or wireless LAN, Bluetooth®, a communication card for a WUSB, a router for optical communication, a router for ADSL, a modem for various types of communications, and the like. The network 932 connected with the communication unit 926 is a network which is connected in a wired or wireless manner and examples of the network 932 include Internet, an intra-home LAN, infrared communication, visible light communication, broadcasting, satellite communication, and the like. Here, the above-mentioned LAN is an abbreviation of a local area network. Further, the above-mentioned WUSB is an abbreviation of a wireless USB. Furthermore, the above-mentioned ADSL is an abbreviation of an asymmetric digital subscriber line.

5: Overview

Finally, a technical content according to the embodiment of the present technology is simply summarized. The technical content which is described here is applicable to various information processing devices such as a PC, a mobile telephone, a portable game machine, a portable information terminal, an information home electric appliance, and a car navigation system and a capacitance type touch sensor which is mounted on the information processing devices, for example.

For example, as such capacitance type touch sensor, such a sensor can be used that includes a plurality of first electrodes which are wired along a first direction, a plurality of second electrodes which are wired along a second direction which is approximately orthogonal to the first direction, and a position detection unit which detects a position of an operation body, which approaches the first and second electrodes, based on capacitance on the first and second electrodes.

As an information processing device on which such capacitance type touch sensor is mounted, a device including a positional information acquisition unit, a capacitance value acquisition unit, and a positional information correction unit which are described later may be used. The positional information acquisition unit acquires positional information showing a position of an operation body which is detected by the position detection unit, from the above-described capacitance type touch sensor. The above-mentioned capacitance value acquisition unit acquires a capacitance value representing a value of capacitance on the first and second electrodes, from the above-described capacitance type touch sensor.

The above-mentioned positional information correction unit corrects positional information which is acquired by the positional information acquisition unit, by using a first correction function and a second correction function. The first correction function includes a first periodic function having first amplitude A1 of which a period is a wiring interval of the first electrodes and which corresponds to a capacitance value which is acquired by the capacitance value acquisition unit. The second correction function includes a second periodic function having second amplitude A2 of which a period is a wiring interval of the second electrodes and which corresponds to a capacitance value which is acquired by the capacitance value acquisition unit.

If a capacitance type touch sensor of which the first and second electrodes constitute a grid is used, waving having a period of the grid appears on a trajectory of a touch position which is detected in a linear drag operation. However, if the technique according to the embodiment of the present technology is applied, waving is cancelled by a correction function having a period of the grid and a trajectory of a correct touch position can be obtained. Further, by using a correction function taking into account of amplitude of waving which changes in accordance with a magnitude of capacitance, waving appearing on the trajectory of a touch position can be more efficiently cancelled. As a result, more accurate trajectory of a touch position can be obtained. Of course, in a case of performing a touch operation other than a drag operation as well, more accurate touch position can be obtained by correcting a touch position by using the above-mentioned correction function.

(Remarks)

The above-described control device 100 is an example of a positional information correction device. The above-described X electrodes 11 and 51 and Y electrodes 21 and 52 are examples of the first electrodes and the second electrodes respectively. The above-described capacitance value detection unit 101 and coordinate calculation unit 102 are examples of a position detecting unit. The above-described coordinate correction unit 103 is an example of a positional information acquisition unit, a capacitance value acquisition unit, a positional information correction unit, and a speed calculation unit.

The preferred embodiment of the present technology has been described with reference to the accompanying drawings hereinbefore, but it is needless to say that embodiments of the present technology are not limited to the examples describe above. It is apparent for those skilled in the art that various modifications or alterations can occur according to the embodiment of the present technology and it should be understood that the modifications and alterations are obviously included in the scope of the present technology.

The present disclosure contains subject matter related to that disclosed in Japanese Priority Patent Application JP 2011-006248 filed in the Japan Patent Office on Jan. 14, 2011, the entire contents of which are hereby incorporated by reference.

What is claimed is:

1. A positional information correction device, comprising:
a positional information acquisition unit configured to acquire positional information showing a position of an operation body, the position being detected by a position detection unit, from a touch sensor that includes a plurality of first electrodes wired along a first direction, a plurality of second electrodes wired along a second direction that is approximately orthogonal to the first direction, and the position detection unit that detects the position of the operation body that approaches the first and second electrodes, based on capacitance on the first and second electrodes;
a capacitance value acquisition unit configured to acquire a capacitance value showing a value of the capacitance on the first and second electrodes from the touch sensor; and
a positional information correction unit configured to correct the positional information that is acquired by the positional information acquisition unit, by using a first correction function that includes a first periodic function having a first amplitude A1 of which a period is a wiring interval of the first electrodes and that corresponds to the capacitance value acquired by the capacitance value acquisition unit and a second correction function that includes a second periodic function having a second amplitude A2 of which a period is a wiring interval of the second electrodes and that corresponds to the capacitance value acquired by the capacitance value acquisition unit.

2. The positional information correction device according to claim 1, wherein the first and second amplitudes increase as the capacitance value decreases.

3. The positional information correction device according to claim 1, wherein the first and second amplitudes have a constant value in a region in which the capacitance value is smaller than a predetermined value, and the first and second amplitudes increase as the capacitance value decreases in a region in which the capacitance value is larger than the predetermined value.

4. The positional information correction device according to claim 1, wherein
the first correction function further includes a third periodic function that has a period, the period being K times (K is an odd number equal to or larger than 3) as large as the period of the first periodic function, and has a third amplitude A3 corresponding to the capacitance value acquired by the capacitance value acquisition unit,
the second correction function further includes a fourth periodic function that has a period, the period being K times as large as the period of the second periodic function, and has a fourth amplitude A4 corresponding to the capacitance value acquired by the capacitance value acquisition unit, and
a rate of the third amplitude with respect to the first amplitude (A3/A1) and a rate of the fourth amplitude with respect to the second amplitude (A4/A2) increase as the capacitance value decreases.

5. The positional information correction device according to claim 1, wherein the positional information correction unit corrects a first coordinate showing a position along the first direction, based on the first correction function, and corrects a second coordinate showing a position along the second direction, based on the second correction function, among the positional information acquired by the positional information acquisition unit.

6. The positional information correction device according to claim 1, further comprising:
a speed calculation unit configured to calculate a moving speed of the operation body based on the positional information that is corrected by the positional information correction unit.

7. The positional information correction device according to claim 1, wherein
the first correction function further includes a third periodic function that has a period, the period being twice as large as the period of the first periodic function, and has a third amplitude A3 corresponding to the capacitance value acquired by the capacitance value acquisition unit,
the second correction function further includes a fourth periodic function that has a period, the period being twice as large as the period of the second periodic function, and has a fourth amplitude A4 corresponding to the capacitance value acquired by the capacitance value acquisition unit, and
a rate of the third amplitude with respect to the first amplitude (A3/A1) and a rate of the fourth amplitude with respect to the second amplitude (A4/A2) have an approximately constant value.

8. The positional information correction device according to claim 1, wherein the periodic functions included in the first and second correction functions are sine functions.

9. The positional information correction device according to claim 1, wherein
the first correction function is used for correcting an interval of positions, the positions being detected by the position detection unit when the operation body is moved at a constant speed along the first direction while keeping the capacitance value constant, so as to bring the interval close to constant, and
the second correction function is used for correcting an interval of positions, the positions being detected by the position detection unit when the operation body is moved at a constant speed along the second direction while keeping the capacitance value constant, so as to bring the interval close to constant.

10. A touch sensor, comprising:
a plurality of first electrodes that are wired along a first direction;
a plurality of second electrodes that are wired along a second direction that is approximately orthogonal to the first direction;
a capacitance detection unit configured to detect a value of capacitance on the first and second electrodes;
a position detection unit configured to detect a position of an operation body that approaches the first and second electrodes, based on the value of capacitance that is detected by the capacitance detection unit; and
a position correction unit configured to correct information of the position that is detected by the position detection unit, by using a first correction function that includes a first periodic function of which a period is a wiring interval of the first electrodes and that has a first amplitude corresponding to the value of the capacitance and a second correction function that includes a second periodic function of which a period is a wiring interval of the second electrodes and that has a second amplitude corresponding to the value of the capacitance.

11. A positional information correction method, comprising:
- acquiring positional information showing a position of an operation body, the position being detected by a position detection unit, from a touch sensor that includes a plurality of first electrodes wired along a first direction, a plurality of second electrodes wired along a second direction that is approximately orthogonal to the first direction, and the position detection unit that detects the position of the operation body that approaches the first and second electrodes, based on capacitance on the first and second electrodes;
- acquiring a capacitance value showing a value of the capacitance on the first and second electrodes from the touch sensor; and
- correcting the positional information that is acquired in acquiring the positional information, by using a first correction function that includes a first periodic function having a first amplitude A1 of which a period is a wiring interval of the first electrodes and that corresponds to the capacitance value acquired in acquiring the capacitance value and a second correction function that includes a second periodic function having a second amplitude A2 of which a period is a wiring interval of the second electrodes and that corresponds to the capacitance value acquired in acquiring the capacitance value.

12. A non-transitory computer-readable medium having embodied thereon a program, which when executed by a computer causes the computer to perform a method, the method comprising:
- acquiring positional information showing a position of an operation body, the position being detected by a position detection unit, from a touch sensor that includes a plurality of first electrodes wired along a first direction, a plurality of second electrodes wired along a second direction that is approximately orthogonal to the first direction, and the position detection unit that detects the position of the operation body that approaches the first and second electrodes, based on capacitance on the first and second electrodes;
- acquiring a capacitance value showing a value of the capacitance on the first and second electrodes from the touch sensor; and
- correcting the positional information that is acquired in acquiring the positional information, by using a first correction function that includes a first periodic function having a first amplitude A1 of which a period is a wiring interval of the first electrodes and that corresponds to the capacitance value acquired in acquiring the capacitance value and a second correction function that includes a second periodic function having a second amplitude A2 of which a period is a wiring interval of the second electrodes and that corresponds to the capacitance value acquired in acquiring the capacitance value.

13. The positional information correction device according to claim 1, wherein the wiring interval of the first electrodes is a distance between adjacent electrodes of the first electrodes in the first direction, and the wiring interval of the second electrodes is a distance between adjacent electrodes of the second electrodes in the second direction.

14. The touch sensor according to claim 10, wherein the wiring interval of the first electrodes is a distance between adjacent electrodes of the first electrodes in the first direction, and the wiring interval of the second electrodes is a distance between adjacent electrodes of the second electrodes in the second direction.

15. The positional information correction method according to claim 11, wherein the wiring interval of the first electrodes is a distance between adjacent electrodes of the first electrodes in the first direction, and the wiring interval of the second electrodes is a distance between adjacent electrodes of the second electrodes in the second direction.

16. The non-transitory computer-readable medium according to claim 12, wherein the wiring interval of the first electrodes is a distance between adjacent electrodes of the first electrodes in the first direction, and the wiring interval of the second electrodes is a distance between adjacent electrodes of the second electrodes in the second direction.

17. The positional information correction device according to claim 1, wherein the positional information correction unit corrects the positional information to compensate for a waving of amplitude of the acquired capacitance on the first and second electrodes appearing on a trajectory of the detected position of the operation body.

* * * * *